United States Patent
Sohmshetty et al.

(10) Patent No.: US 7,066,533 B2
(45) Date of Patent: Jun. 27, 2006

(54) TUBULAR FRONT END STRUCTURE FOR AUTOMOBILES AND METHOD FOR MAKING THE SAME

(75) Inventors: Raj Sohmshetty, Canton, MI (US); Larry Dupuis, Grosse Ile, MI (US); James Lowe, Temperance, MI (US); Musa Azzouz, Northville, MI (US); Michael Azzouz, Livonia, MI (US); Dragan Stojkovic, Southgate, MI (US); Madhu Deme, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 10/859,687

(22) Filed: Jun. 3, 2004

(65) Prior Publication Data

US 2005/0269838 A1 Dec. 8, 2005

(51) Int. Cl.
*B62D 26/08* (2006.01)

(52) U.S. Cl. ............ 296/203.02; 296/205; 296/187.09; 296/193.09; 296/192; 296/29

(58) Field of Classification Search ........... 296/203.02, 296/203.01, 205, 193.09, 187.09, 192, 29
See application file for complete search history.

(56) References Cited

U.S. PATENT DOCUMENTS

| | | | | |
|---|---|---|---|---|
| 4,078,840 A | * | 3/1978 | Itoh | 296/192 |
| 4,840,423 A | * | 6/1989 | Maekawa | 296/203.02 |
| 4,886,314 A | * | 12/1989 | Maeda | 296/192 |
| 5,042,872 A | * | 8/1991 | Yoshii | 296/203.02 |
| 5,052,742 A | * | 10/1991 | Akoshima et al. | 296/192 |
| 5,201,566 A | * | 4/1993 | Mori | 296/192 |
| 5,269,585 A | | 12/1993 | Klages et al. | |
| 5,271,473 A | | 12/1993 | Ikeda et al. | |
| 5,303,973 A | * | 4/1994 | Fujii | 296/203.02 |
| 5,575,526 A | | 11/1996 | Wycech | |
| 5,720,092 A | | 2/1998 | Ni et al. | |
| 6,086,144 A | * | 7/2000 | Kuwano | 296/192 |
| 6,170,906 B1 | * | 1/2001 | Kasuga | 296/203.02 |
| 6,209,950 B1 | * | 4/2001 | Hanyu | 296/203.02 |
| 6,227,321 B1 | | 5/2001 | Frascaroli et al. | |
| 6,250,710 B1 | * | 6/2001 | Matsuzaki | 296/203.02 |
| 6,332,642 B1 | * | 12/2001 | Hanyu | 296/203.02 |
| 6,357,821 B1 | * | 3/2002 | Maj et al. | 296/193.09 |
| 6,386,624 B1 | | 5/2002 | Schultz et al. | |
| 6,409,255 B1 | * | 6/2002 | Tilsner et al. | 296/198 |
| 6,416,119 B1 | * | 7/2002 | Gericke et al. | 296/205 |
| 6,428,074 B1 | * | 8/2002 | Sukegawa et al. | 296/29 |
| 6,450,276 B1 | | 9/2002 | Latcau | |
| 6,467,146 B1 | | 10/2002 | Herman | |
| 6,532,639 B1 | | 3/2003 | Ni et al. | |
| 6,533,348 B1 | * | 3/2003 | Jaekel et al. | 296/205 |
| 6,540,284 B1 | | 4/2003 | Miyata | |
| 6,755,461 B1 | * | 6/2004 | Seksaria et al. | 296/193.04 |
| 6,814,400 B1 | * | 11/2004 | Henderson et al. | 296/193.09 |
| 6,921,126 B1 | * | 7/2005 | Suh et al. | 296/192 |

\* cited by examiner

*Primary Examiner*—D. Glenn Dayoan
*Assistant Examiner*—Greg Blankenship
(74) *Attorney, Agent, or Firm*—Fredrick V. Owens

(57) ABSTRACT

A front end assembly for a vehicle includes a U-shaped tubular structure, a body portion having a pair of laterally-spaced, longitudinally extending cowl sides, and, a pair of laterally-spaced A-pillar structures. The U-shaped tubular structure is secured to each A-pillar and each cowl side at longitudinally-spaced apart locations. The laterally-spaced connection points provide improved rigidity and reduce distortion.

34 Claims, 5 Drawing Sheets

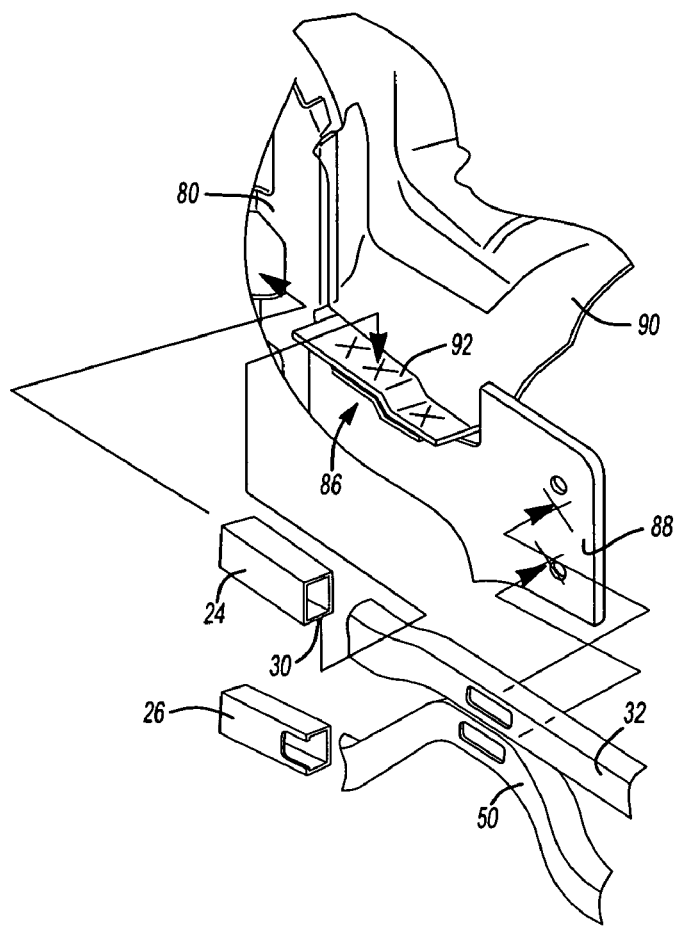
Fig-4
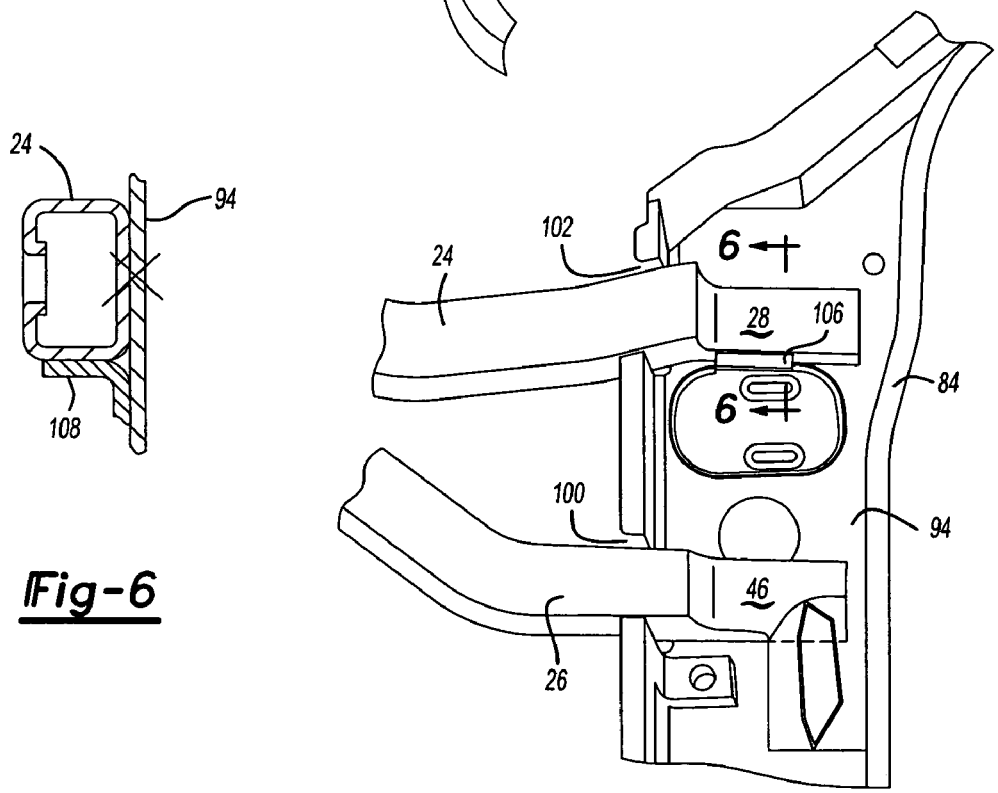
Fig-6
Fig-5

TUBULAR FRONT END STRUCTURE FOR AUTOMOBILES AND METHOD FOR MAKING THE SAME

BACKGROUND OF THE INVENTION

1. Field of the Invention

The present invention relates to a front end assembly for an automobile vehicle.

2. Background Art

Conventional front end assemblies are often made by stamping and welding together several individual frame components. One of the major challenges for manufacturing is to maintain rigidity because these assemblies are often a combination of a number of various frame parts. As each of the frame parts are attached to form subassemblies and then are attached to the body portion of the vehicle, it becomes more difficult to achieve the necessary or desired stiffness in the front end. This problem is sometimes referred to as "matchboxing." Matchboxing is a phenomenon that occurs when the sheet metal portion of the vehicle is attached to the frame and tends to sway on a hinge point and move from a desired perfect square orientation to a parallelogram orientation. Distorting the sheet metal in this manner may result in poor natural frequency characteristics of the front end structure.

Hydro-formed tubular elements are increasingly being used in the construction of vehicle body structures. Hydroforming is a metal forming process that uses high-pressure fluids to outwardly expand tubular blanks to conform with the surfaces of a die cavity of a die assembly to form a contoured hydro-formed part.

Vehicle front end assembly processes have yet to take full advantage of the capabilities of tubular hydro-formed parts. A number of prior patents have described the use of tubular members in hybrid front end assemblies, but fail to address the matchboxing issue. For example, Gerricke et al., U.S. Pat. No. 6,416,119 B1, describes a vehicle front end constructed through the use of hydro-formed tubes. In Gerricke, a first body structure formed from a plurality of tube members and a second body structure formed from sheet metal are welded to each other in a sandwiching relationship. However, this method is still subject to matchboxing because the sheet metal structure can be distorted as it is secured to the tube members.

There is a need for a front end construction that may incorporate the use of hydro-formed tubes that provides superior stiffness and rigidity when compared to conventional vehicle front end assembly designs. There is a further need for a front end assembly process that minimizes any tendency of the assembly to distort or matchbox. There is also a need to eliminate structural reinforcements, reduce part counts, and improve the durability of the vehicle body.

The above problems and needs are addressed by Applicants' invention as summarized below.

SUMMARY OF THE INVENTION

The present invention provides A front end assembly for a vehicle, comprising a U-shaped tubular structure, a body portion having a pair of laterally-spaced, longitudinally extending cowl sides, and a pair of laterally-spaced A-pillar structures. The U-shaped tubular structure is secured to each A-pillar and each cowl side at longitudinally-spaced apart locations. The longitudinally-spaced connection of the U-shaped tubular structure provides improved rigidity and reduces distortion.

A second aspect of the present invention is to provide a method for assembling a vehicle front end having a pair of side tubes each having a front end portion, a body end portion, a first connecting point, and a second connecting point, a radiator support tube having a left end and a right end, a pair of A-pillars each having a securing portion, a body structure having a pair of cowl sides each containing a pair of first and second cowl side securing points, the tubular side structures being secured to each A-pillar and each cowl side at longitudinally-spaced apart locations. The method includes connecting the radiator support tube extending in a transverse direction to the front ends of the pair of side tubes extending in a longitudinal direction with the left end and the right end to form a generally U-shaped tubular structure. The body structure extending in a transverse direction is aligned with the U-shaped tubular structure such that the pair of first connecting points are disposed adjacent to the pair of first cowl side securing points. The pair of A-pillar structures are aligned with the U-shaped tubular structure such that the body end portion of each side tube contacts one of the securing portions of the A-pillar. The U-shaped tubular structure is joined to the A-Pillar, the body structure, and the cowl top at longitudinally-spaced connection points such that a body end portion is secured to each of the pair of A-pillar securing portions, and each of the second connecting points are secured to one of second securing points of the cowl side.

A third aspect of the present invention is to provide a front end assembly for a vehicle comprising a U-shaped tubular structure comprising an inboard surface and an outboard surface, the outboard surface having a pair of laterally-spaced end connections, the inboard surface having at least one pair of laterally-spaced connecting points, a body portion having a pair of laterally-spaced, longitudinally extending cowl sides, and a pair of laterally-spaced A-pillar structures, each A-pillar having a sidewall and a transverse wall. The U-shaped tubular structure is secured between each A-pillar and each cowl side at longitudinally-spaced apart locations such that each end connection is secured to one of the sidewall walls such that the U-shaped tubular structure passes through each transverse wall and each of the side tube structure connecting points is secured to one of the cowl sides.

A fourth aspect of the present invention is to A front end assembly for a vehicle comprising a pair of laterally spaced side tube structures having an upper tube and a lower tube, each side tube structure having a front end, a body end, a first connecting point, and a second connecting point, a radiator support tube structure, a body portion having a pair of first and second securing points laterally spaced apart, and a pair of A-pillar structures laterally spaced apart having a sidewall and a transverse wall, each sidewall having a first securing point and a second securing point. The side tube structures are secured between each A-pillar and each cowl side at longitudinally-spaced apart locations such that each side tube structure passes through one A-pillar transverse wall such that the body end is secured to one A-pillar first securing point and to one A-pillar second securing point, each side tube structure front end is secured to the radiator support tube structure, and each side tube structure first connecting point and second connecting point are secured to one body portion first securing point and one body portion second securing point.

These and other features and advantages of the invention will be more fully understood from the following detailed description of the invention in view of the accompanying drawings.

BRIEF DESCRIPTION OF THE DRAWINGS

FIG. 4 is a fragmentary perspective view of a portion of a front end assembly made according to one embodiment of the present invention;

FIG. 5 is a fragmentary interior side elevation view of an A-pillar attached to two tubular frame members according to one embodiment of the present invention;

FIG. 6 is a cross-sectional view taken along the line 6—6 in FIG. 5;

DETAILED DESCRIPTION OF THE PREFERRED EMBODIMENTS

Figure 1:
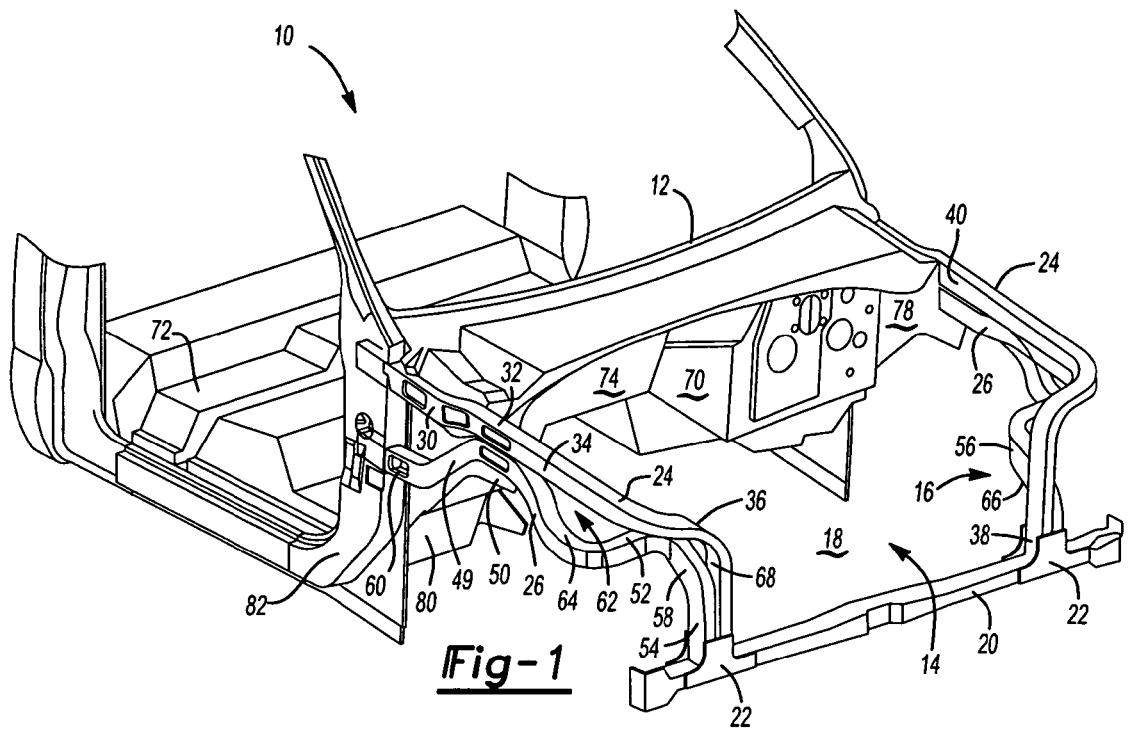
FIG. 1 is a perspective view of an improved front end assembly made according to one embodiment of the present invention.

Referring to FIG. 1, an improved front end assembly for a vehicle is generally identified by reference numeral 10. The front end assembly 10 comprises a body portion 12 and a U-shaped tubular structure 14. The U-shaped tubular structure 14 comprises a left side tube structure 16, a right side tube structure 18 and a radiator support tube structure 20. Right and left side designations as used herein refer to the sides of the vehicle relative to the driver of the vehicle. The side tube structures 16,18 are mirror images of each other. Each side tube structure 16,18 extends in a longitudinal direction generally further forward of the body portion 12 to a radiator support structure 20. The radiator support structure 20 generally extends transversely across the front of the vehicle and perpendicular to the longitudinal direction of the side tube structures 16 and 18. Each side tube structure is independently connected to the radiator support structure 20 by a U-shaped bracket 22 or similar connector. The tubes are hydroformed. They can also be formed from extrusions, seamless tubes or seamed tubes. The tubes may be formed with varying thicknesses throughout their length to save weight.

Figure 2:
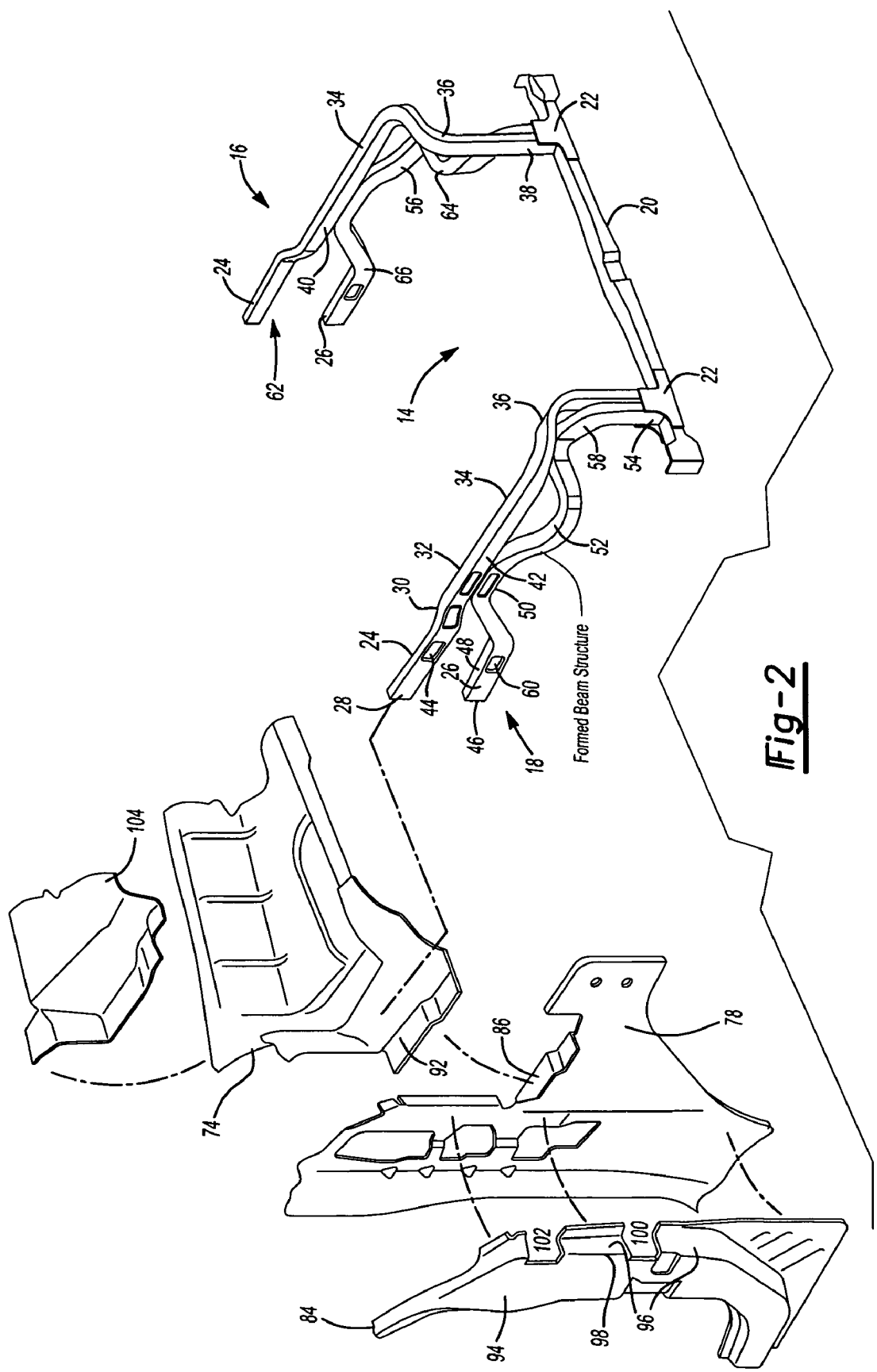
FIG. 2 is an exploded perspective view of an improved front end assembly according to one embodiment of the present invention.

Referring to FIGS. 1 and 2, the left and right side tube structures each comprise an upper tube 24 and a lower tube 26. Each upper tube 24 comprises a body end 28, a first connecting point 30, a second connecting point 32, a support portion 34, an upper cooling portion 36, and a front end 38. The upper tube 24 has an inboard surface 40 and an outboard surface 42. The outboard surface 42 has a plurality of access holes 44 that provide clearance for installation as well as performing securing operations. The upper tube 24 extends from a higher relative vertical position to a lower vertical position between the upper cooling portion 36 and the front end 38. The front end 38 is attached to the radiator support tube 20.

Each lower tube 26 of the left and right side tube structures 16,18 comprises a body end 46, a first connecting point 48, a second connecting point 50, a support portion 52, and a front end 54. Each lower tube 26 has an inboard surface 56 and an outboard surface 58. The lower tube has a plurality of access holes 60 that provide access for installation and for performing welding or other assembly operations associated with the assembly of the front end.

The lower tube 26 and the upper tube 24 are secured together in order to form each of the side tube structures 16,18. In the preferred embodiment of FIG. 1, a bottom surface 62 of the upper tube 24 and a top surface 64 of the lower tube 26 are secured to each other along the respective surfaces to allow the upper tube second connecting point 32 and the lower tube second connecting point 50 to be disposed in close proximity to each other. Furthermore, an inboard surface 66 of the lower tube 26 and an outboard surface 42 of the upper tube 24 are secured together in close proximity to the upper tube front end 38 and the lower tube front end 54 respectively. The upper tubes 24 and the lower tubes 26 extend longitudinally toward the front of the vehicle and joined together prior to connecting to the radiator support tube 20. The upper tube 24 is formed to be inboard of the lower tube 26 such that the upper tube front end 38 is disposed in a vertical plane inboard of the upper body end 28. Similarly, the lower tube front end 54 is located in a vertical plane more inboard than the lower tube body end 46.

The body portion 12 will now be further described. A dash structure 70 and an underbody structure 72 are joined together. A cowl inner structure 74 is attached along the forward portion of the dash 70. A pair of cowl sides 78, 80 are each attached longitudinally to the dash 70 and cowl inner 74.

A pair of laterally-spaced A-pillars 82,84 are positioned such that each is outboard of the respective cowl side. The left and right cowl sides 80, 78 and the left and right A-pillars 84,82 are mirror images of each other. The right A-pillar 82 is shown attached to the right cowl side 78, the dash structure 70, and the underbody structure 72. Body portion 12 may be formed from sheet metal or structural plastic components that are combined to form an assembly.

FIG. 2 is an exploded view of a partial side perspective of one embodiment of the invention. The right cowl side 78 includes a cowl side flange 86 that extends in an outboard direction and forms essentially a 90 degree angle with the cowl side 78. A portion of the right cowl side 78 extends forward longitudinally and contains a second securing point 88. A plurality of vertical clearance holes 89 are formed in each cowl side to allow for thru access to the A-pillar 84 (described below).

Referring to FIGS. 1 and 2, the cowl inner 74 is the part of the body portion 12 extending laterally in a horizontal plane between the pair of cowl sides 78,80. Referring to FIG. 2, a portion of the cowl inner 74 shows a peripheral flange 92 extends in an outboard direction from an end portion 90 of the cowl inner 74.

Each A-pillar 82,84 comprises a sidewall 94 that extends generally in a vertical and longitudinal plane. A transverse wall 96 extends inwardly from a forward edge 98 of the A-pillar towards the cowl side inner 78. The transverse wall 96 has a lower clearance opening 100 and an upper clearance opening 102 separated by a portion of the transverse wall 96.

A cowl top 104 is shown extending across the top of the cowl inner 74. The cowl top 104 is attached to the cowl inner 74 and the cowl side 78. A formed flange 106 is provided on each end of the cowl top 104.

Figure 3:
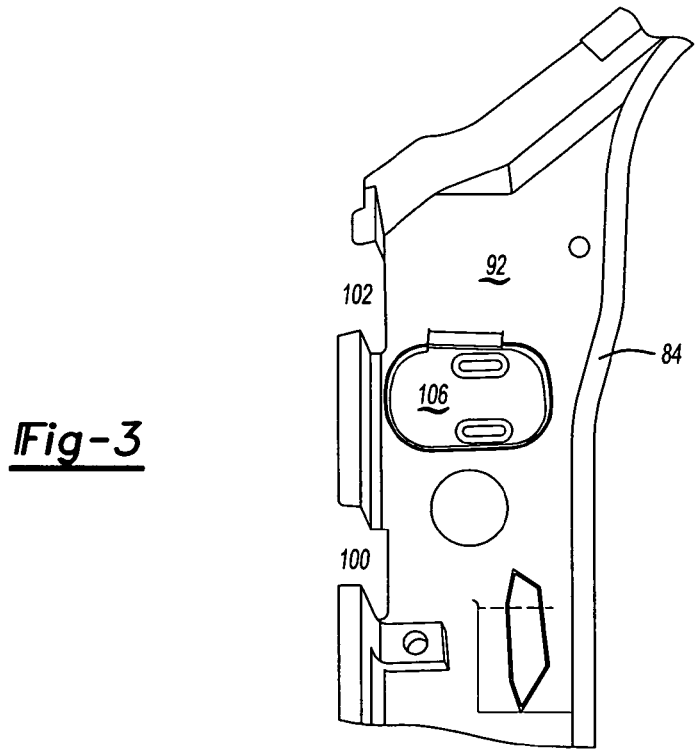
FIG. 3 is a fragmentary interior side elevation view of an A-pillar made according to one embodiment of the present invention.

Referring to FIG. 3, an interior surface 108 of the sidewall 94 of the right A-pillar 82 is shown supporting a hinge reinforcement bracket 110. Bracket 110 is attached to the interior surface 108 of each A-pillar. The bracket 110 is attached to the A-pillar 82 by either fasteners or a welding process. A perpendicular flange 111 of the upper hinge reinforcement bracket 110 extends inwardly from the interior surface 108. The flange is located to be level with the lower edge of the clearance opening 102.

The body portion 12 and the U-shaped tubular structure 14 connections shall be described in detail with specific reference to FIGS. 1, 2, and 4. The body portion comprises the underbody structure 72, the dash structure 70, the cowl inner 74, and the left and right cowl sides 80,78 that are assembled together. FIG. 1 shows the cowl inner 74 attached to the left cowl side 80 and the right cowl side 78. A right cowl end portion 90 contains a peripheral flange 92 which is fabricated to mate with the corresponding cowl side flange 86 located on each cowl side 78,80.

FIG. 4 is a fragmentary view of a portion of the front end assembly in its final position. The cowl side flange 86 and the peripheral flange 92 are secured together. The upper tube 24 rests on top of the peripheral flange 92. The first connecting point 30 is disposed on the peripheral flange 92. Each upper tube can be secured to each peripheral flange 92 by conventional means through the access hole 44. The second securing point 88 located on each cowl side is disposed adjacent to the upper tube second connecting portion 32 and the lower tube second connecting point 50. Access holes 44 in the upper and lower tubes provide for the use of conventional securing methods such as spot welding to be used.

Referring to FIG. 5, the right A-pillar 82 is assembled to the body end portion 46 and body end portion 28 of the U-shaped tubular structure 14. The upper tube 24 passes through the forward clearance opening 102 of the A-pillar and rests on the flange surface 111 of the upper hinge reinforcement bracket 110. The lower tube 26 extends through the lower clearance opening 100 of the A-pillar 82 and contacts the A-pillar sidewall 94 to which it is secured.

Referring to FIG. 6, the upper tube 24 is shown resting on the flange 111 of the hinge reinforcement bracket. The upper tube may be secured to both the sidewall 92 and the flange 111 by spot welding or another conventional securing method.

Figure 7:
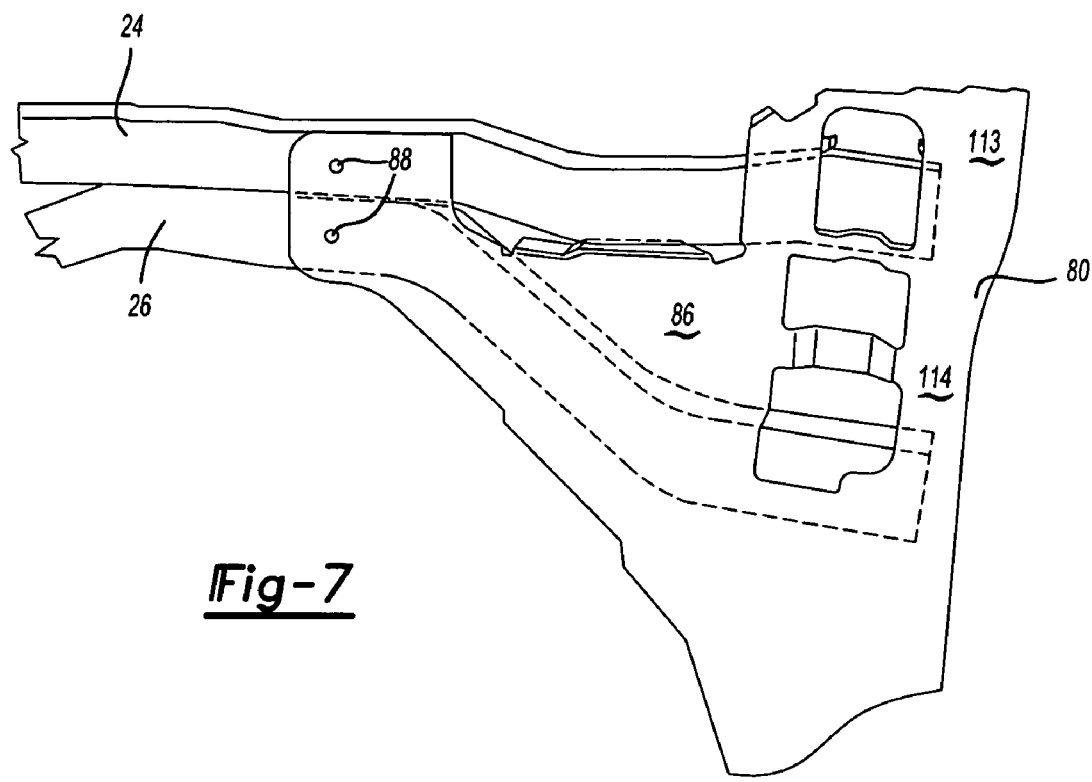
FIG. 7 is a fragmentary interior side elevation view of a cowl panel attached to two tubular frame members according to one embodiment of the present invention.

Referring to FIG. 7, an interior side view of the cowl side 78 attached to the upper and lower tubes 24,26 will be described. The upper and lower tubes 24,26 are secured at the second securing point 88. The upper tube 24 is supported by the cowl side flange 86. An upper access hole 113 and a lower access hole 114 are provided in the cowl side 78. Access holes 113 and 114 are aligned with the upper and lower tubes 24 and 26, respectively, to provide access for assembly operations.

Figure 8:
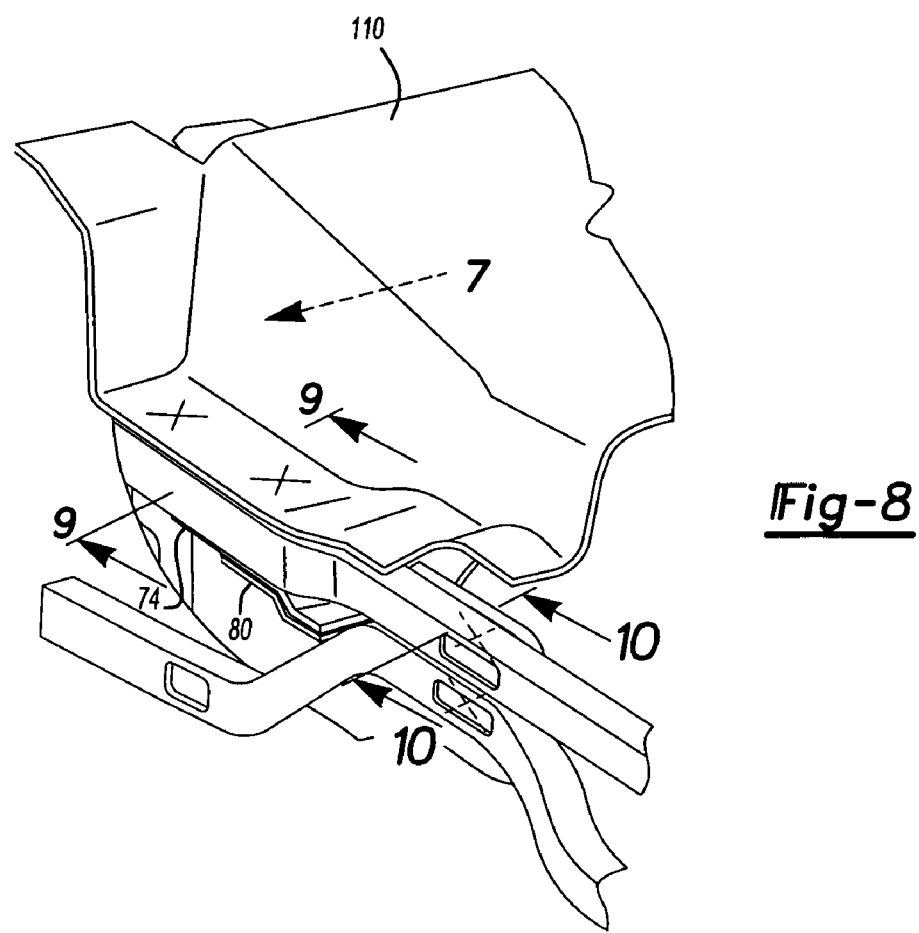
FIG. 8 is a fragmentary perspective view of an improved front end assembly made according to one embodiment of the present invention.
Figure 9:
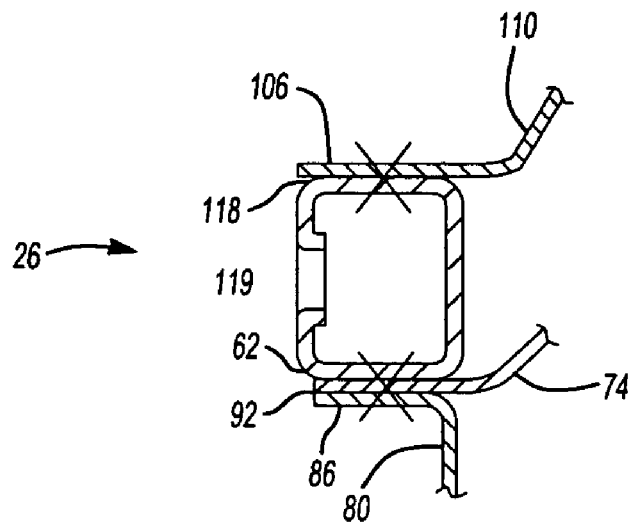
FIG. 9 is a cross-sectional view taken along the line 9—9 in FIG. 8.

Referring to FIGS. 8 and 9, the cowl top 110 is disposed over the top of the cowl inner 74. The cowl top flange 106 located on each end of the cowl top 110 is aligned with a top surface of the upper tube 118 adjacent to the first connecting point 30. Upper tube 26 has an access or clearance hole 119 in its outboard surface for securing the cowl top flange 106 to the upper tube top surface 118. The access hole 119 also provides for securing the upper tube bottom surface 62 to both the cowl inner peripheral flange 92 and the cowl side flange 86.

Figure 10:
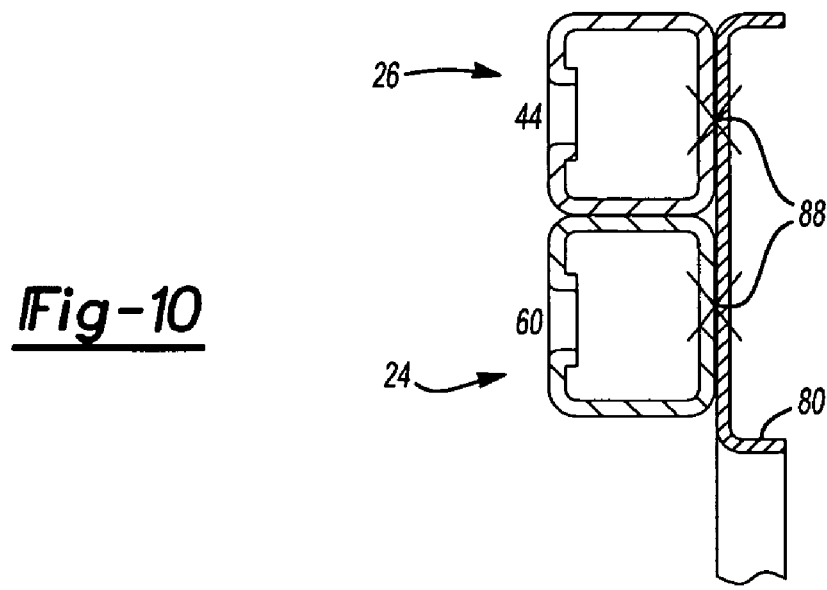
FIG. 10 is a cross-sectional view taken along the line 10—10 in FIG. 8.

Referring to FIG. 10, a cross-sectional view taken along the line of 10—10 in FIG. 8 will now be described. The upper tube 24 and the lower tube 26 have clearance holes 44,50, respectively in their outboard surfaces to provide access for conventional securing tools to attach the tubes to the cowl side 78.

In an alternative embodiment of a front end assembly, the lower tube 26 and the upper tube 24 may be secured together in order to form each side tube structures similar to FIGS. 1 and 2 with each lower tube 26 of the left and right side tube structures 16,18 comprising a body end 46 moved further outboard than the upper tube body end 28. The vertical offset of the upper and lower tubes would provide further rigidity. Correspondingly, each of the A-pillar sidewalls and transverse walls would be mirror the offset to accommodate the upper and lower tubes.

While the best mode for carrying out the invention has been described in detail, those familiar with the art to which this invention relates will recognize various alternative designs and embodiments for practicing the invention as defined by the following claims.

What is claimed is:

1. A front end assembly for a vehicle, comprising:
 a U-shaped tubular structure;
 a body portion having a pair of laterally-spaced, longitudinally extending cowl sides; and,
 a pair of laterally-spaced A-pillar structures;
 wherein the U-shaped tubular structure is secured to each A-pillar and each cowl side at longitudinally-spaced apart locations.

2. The front end assembly of claim 1, wherein the U-shaped tubular structure is hydroformed.

3. A front end assembly for a vehicle, comprising:
 a U-shaped tubular structure having an inboard surface and an outboard surface;
 a body portion having a pair of laterally-spaced, longitudinally extending cowl sides; and,
 a pair of laterally-spaced A-pillar structures;
 wherein the U-shaped tubular structure is secured between each A-pillar and each cowl side at longitudinally-spaced apart locations such that the outboard surface is secured to each A-pillar and the inboard surface is secured to each cowl side.

4. The front end assembly of claim 3, wherein the U-shaped tubular structure is hydroformed.

5. A front end assembly for a vehicle, comprising:
 a U-shaped tubular structure having an inboard surface and an outboard surface, the outboard surface having a pair of laterally-spaced end connections, the inboard surface having at least one pair of laterally-spaced connecting points;
 a body portion having a pair of laterally-spaced, longitudinally extending cowl sides; and
 a pair of laterally-spaced A-pillar structures;
 wherein the U-shaped tubular structure is secured between each A-pillar and each cowl side at longitudinally-spaced apart locations such that each end connection is secured to one of the A-pillars and each of the connecting points is secured to one of the cowl sides.

6. The front end assembly of claim 5, wherein the U-shaped tubular structure is hydroformed.

7. The front end assembly of claim 5, wherein the outboard surface has a plurality of slotted apertures.

8. A front end assembly for a vehicle comprising:
 a pair of laterally spaced side tube structures comprising a right side tube structure and a left side tube structure, each side tube structure having a front end, a body end, a first connecting point, and a second connecting point;
 a radiator support tube structure having a left portion and a right portion;

a body portion having a left and a right first securing point laterally spaced apart and a left and a right second securing point laterally spaced apart; and a left and a right A-pillar structure laterally spaced apart, each A-pillar structure having a first securing point and a second securing point;

wherein each of the side tube structures are secured between each A-pillar and each cowl side at longitudinally-spaced apart locations such that the left side tube structure body end is secured to the left A-pillar first and second securing points, the right side tube structure body end is secured to the right A-pillar first and second securing points, the left side tube structure front end is secured to the radiator support tube left portion, the right side tube structure front end is secured to the radiator support tube right portion, the left side tube structure first and second connecting points are secured to the left body portion first and second securing points respectively, and the right side tube structure first and second connecting points are secured to the right body portion first and second securing points respectively.

9. The front end assembly of claim 8, wherein the left side tube structure, the right side tube structures, and the radiator support tube structure are hydroformed.

10. The front end assembly of claim 8, wherein each side tube structure is connected to one A-pillar and the body portion such that each side tube structure body end is connected to one first and one second A-pillar securing point in a first longitudinal plane, the first connecting point is secured to the first securing point in a second longitudinal plane that is spaced from the first longitudinal plane, and the second connecting point is secured to the second securing point in a third longitudinal plane that is spaced from the first and second longitudinal planes.

11. A front end assembly for a vehicle comprising:
a pair of laterally spaced side tube structures each having an upper tube and a lower tube, each side tube structure having a front end, a body end, a first connecting point, and a second connecting point;
a radiator support tube structure;
a body portion having a pair of first and second securing points laterally spaced apart;
a pair of A-pillar structures laterally spaced apart, each A-pillar structure having a first securing point and a second securing point;
wherein the side tube structures are secured between each A-pillar and the body portion at longitudinally-spaced apart locations such that each side tube structure body end is secured to one A-pillar first securing point and to one A-pillar second securing point, each side tube structure front end is secured to the radiator support tube structure, and each side tube structure first connecting point and second connecting point are secured to one body portion first securing point and one second securing point.

12. The front end assembly of claim 11, wherein the pair of laterally-spaced side tube structures and the radiator support tube structure are hydroformed.

13. The front end assembly of claim 11, wherein each side tube structure is connected to one A-pillar and the body portion such that each body end is connected to one first and one second securing point in a first longitudinal plane, the first connecting point is secured to the first securing point in a second longitudinal plane that is spaced from the first longitudinal plane, and the second connecting point is secured to the second securing point in a third longitudinal plane that is spaced from the first and second longitudinal planes.

14. The front end assembly of claim 11, wherein each upper tube is supported by the body portion adjacent to the first securing point.

15. The front end assembly of claim 11, wherein each lower tube is further secured to the body portion between the body end and the second connecting point.

16. A front end assembly for a vehicle, comprising:
a U-shaped tubular structure comprising an inboard surface and an outboard surface, the outboard surface having a pair of laterally-spaced end connections, the inboard surface having at least one pair of laterally-spaced connecting points;
a body portion having a pair of laterally-spaced, longitudinally extending cowl sides; and
a pair of laterally-spaced A-pillar structures, each A-pillar having a sidewall and a transverse wall;
wherein the U-shaped tubular structure is secured between each A-pillar and each cowl side at longitudinally-spaced apart locations such that each end connection is secured to one of the sidewall walls such that the U-shaped tubular structure passes through each transverse wall and each of the side tube structure connecting points is secured to one of the cowl sides.

17. The front end assembly of claim 16, wherein the U-shaped tubular structure is hydroformed.

18. The front end assembly of claim 16, wherein the outboard surface has a plurality of slotted apertures.

19. A front end assembly for a vehicle comprising:
a pair of laterally spaced side tube structures having an upper tube and a lower tube, each side tube structure having a front end, a body end, a first connecting point, and a second connecting point;
a radiator support tube structure;
a body portion having a pair of first and second securing points laterally spaced apart; and
a pair of A-pillar structures laterally spaced apart having a sidewall and a transverse wall, each sidewall having a first securing point and a second securing point;
wherein the side tube structures are secured between each A-pillar and the body portion at longitudinally-spaced apart locations such that each side tube structure passes through one A-pillar transverse wall such that the body end is secured to one A-pillar first securing point and to one A-pillar second securing point, each side tube structure front end is secured to the radiator support tube structure, and each side tube structure first connecting point and second connecting point are secured to one body portion first securing point and one body portion second securing point.

20. The front end assembly of claim 19, wherein the pair of laterally-spaced side tube structures and the radiator support tube structure are hydroformed.

21. The front end assembly of claim 19, wherein the upper tube and the lower tube each passes through the transverse wall at vertically discrete locations.

22. A front end assembly for a vehicle, comprising:
a U-shaped tubular structure comprising an inboard surface and an outboard surface, the outboard surface having a pair of laterally-spaced end connections, the inboard surface having at least one pair of laterally-spaced connecting points;
a body portion having a pair of laterally spaced, longitudinally extending cowl sides;
a pair of laterally-spaced A-pillar structures, and
a cowl top;
wherein the U-shaped tubular structure is secured between each A-pillar and each cowl side at longitudinally-spaced apart locations such that each end connection is secured to one of the A-pillars, each of the connecting points is secured to one of the cowl sides, and the cowl top is connected to the U-shaped tubular structure and to each of the cowl sides.

23. The front end assembly of claim 22, wherein the U-shaped tubular structure is hydroformed.

24. A front end assembly for a vehicle comprising:
   a pair of laterally spaced side tube structures having a right side tube structure and a left side tube structure, each side tube structure having a front end, a body end, a first connecting point, and a second connecting point;
   a radiator support tube structure having a left portion and a right portion;
   a body portion having a left and a right first securing point laterally spaced apart and a left and a right second securing point laterally spaced apart;
   a left and a right A-pillar structure laterally spaced apart, each A-pillar structure having a sidewall and a transverse wall, the sidewall comprising a first securing point and a second securing point; and
   a cowl top having a pair of laterally spaced connecting points,
wherein the side tube structures are secured between each A-pillar and each cowl side at longitudinally-spaced apart locations such that the left side tube structure passes through the left A-pillar transverse wall such that the left side tube structure body end is secured to the left A-pillar first and second securing points, the right side tube structure passes through the right A-pillar transverse wall such that the right side tube structure body end is secured to the right A-pillar first and second securing points, the left side tube structure front end is secured to the radiator support tube left portion, the right side tube structure front end is secured to the radiator support tube right portion, the left side tube structure first and second connecting points are secured to the left body portion first and second securing points respectively, the right side tube structure first and second connecting points are secured to the right body portion first and second securing points respectively, and each side tube first connecting point is secured to one cowl top connecting point.

25. The front end assembly of claim 24, wherein the side tube structures and the radiator support structure are hydroformed.

26. A front end assembly for a vehicle comprising:
   a pair of laterally spaced side tube structures, each side tube structure having an upper tube and a lower tube, a front end, a body end, a first connecting point, and a second connecting point;
   a radiator support tube structure;
   a body portion having a pair of first and second securing points laterally spaced apart;
   a pair of A-pillar structures laterally spaced apart, each A-pillar structure having a first securing point and a second securing point; and
   a cowl top;
wherein the side tube structures are secured between each A-pillar and each cowl side at longitudinally-spaced apart locations such that each side tube structure body end is secured to one A-pillar first securing point and to one A-pillar second securing point, each side tube structure front end is secured to the radiator support tube structure, each side tube structure first connecting point and second connecting point are secured to one body portion first securing point and one second securing point, and the cowl top is connected to each upper tube and the body portion.

27. The front end assembly of claim 26, wherein the U-shaped tubular structure is hydroformed.

28. A method for assembling a vehicle front end having a pair of side tubes each having a front end, a body end portion, a first connecting point, and a second connecting point, a radiator support tube having a left end portion and a right end portion, a pair of A-pillars each having a securing portion, and a body portion extending in a transverse direction having a pair of cowl sides each containing a pair of first and second cowl side securing points the method comprising the steps of:
   connecting the left and right front end portion of the radiator support tube extending in a transverse direction between the pair of side tubes extending in a longitudinal direction to form a generally U-shaped tubular structure;
   connecting the body portion to the U-shaped tubular structure such that the pair of first connecting points are attached to the pair of first cowl side securing points;
   connecting the body portion to the U-shaped tubular structure such that the pair of second connecting points are attached to the pair of second cowl side securing points; and
   connecting the pair of A-pillar structures to the U-shaped tubular structure such that the body end portion of each side tube attaches to one of the securing portions of the A-pillar,
wherein the side tube structures are secured between each A-pillar and each cowl side at longitudinally-spaced apart locations.

29. A method of claim 28, wherein the side tube structures are hydroformed.

30. A method of claim 28, wherein the radiator support tube is hydroformed.

31. A method for assembling a vehicle front end having a pair of side tubes each having a front end, a body end portion, a first connecting point, and a second connecting point, a radiator support tube having a left end portion and a right end portion, a pair of A-pillars each having a transverse wall, a sidewall, and a sidewall securing portion, a body portion extending in a transverse direction having a pair of cowl sides each containing a pair of first and second cowl side securing points, the method comprising the steps of:
   connecting the left and right end portions of the radiator support tube extending in a transverse direction between the pair of side tubes extending in a longitudinal direction to form a generally U-shaped tubular structure;
   connecting the body portion with the U-shaped tubular structure such that the pair of first connecting points are attached to the pair of first cowl side securing points;
   connecting the body portion with the U-shaped tubular structure such that the pair of second connecting points are attached to the pair of second cowl side securing points; and
   connecting the pair of A-pillar structures with the U-shaped tubular structure such that each body end portion passes through the transverse wall and attaches to the sidewall securing portion,
wherein the side tube structures are secured between each A-pillar and each cowl side at longitudinally-spaced apart locations.

32. A method of claim 31, wherein the side tube structures and the radiator support tube are hydroformed.

33. A method for assembling a vehicle front end having a pair of side tubes each having a front end, a body end portion, a first connecting point, and a second connecting point, a radiator support tube having a left end portion and a right end portion, a pair of A-pillars each having a securing portion, and a body portion extending in a transverse direction having a pair of cowl sides each containing a pair of first and second cowl side securing points, the method comprising the steps of:

connecting the left and right end portions of the radiator support tube extending in a transverse direction between the pair of side tubes extending in a longitudinal direction to form a generally U-shaped tubular structure;

aligning the body portion with the U-shaped tubular structure such that the pair of first connecting points are disposed adjacent to the pair of first cowl side securing points;

aligning the pair of A-pillar structures with the U-shaped tubular structure such that the body end portion of each side tube contacts one of the securing portions of the A-pillar;

joining the U-shaped tubular structure to each A-pillar, the body portion, and the cowl top at longitudinally-spaced connection points, wherein a body end portion is secured to one of the A-pillar securing portions, and each of the second connecting points are secured to one of the cowl side second securing points such that the side tube structures are secured between each A-pillar and each cowl side at longitudinally-spaced apart locations.

34. A method for assembling a vehicle front end having a pair of side tubes each having a front end, a body end portion, a first connecting point, and a second connecting point, a radiator support tube having a left end portion and a right end portion, a pair of A-pillars each having a transverse wall, a sidewall, and a sidewall securing portion, a body portion extending in a transverse direction and having a pair of cowl sides each containing a pair of first and second cowl side securing points, and a cowl top having a pair of cowl top connection points, the method comprising the steps of:

connecting the left and right end portions of the radiator support tube extending in a transverse direction between the pair of side tubes extending in a longitudinal direction to form a generally U-shaped tubular structure;

aligning the body portion with the U-shaped tubular structure such that the pair of first connecting points are disposed adjacent to the pair of first cowl side securing points;

aligning the pair of A-pillar structures with the U-shaped tubular structure such that the body end portion of each side tube passes through the transverse wall and contacts the sidewall securing portion;

aligning the cowl top with the body portion and the U-shaped tubular structure such that each cowl top connection is adjacent to one of the first cowl side connection points; and joining the U-shaped tubular structure to each A-pillar, the body portion, and the cowl top wherein a body end portion is secured to one of the A-pillar securing portions, wherein each cowl top connection is secured to one of the first securing points of the cowl side, and wherein each of the second connecting points are secured to one of the cowl side second securing points such that the side tube structures are secured between each A-pillar and each cowl side at longitudinally-spaced apart locations.

* * * * *